United States Patent [19]

Herold et al.

[11] Patent Number: 5,110,159
[45] Date of Patent: May 5, 1992

[54] ROTATING UNION FOR SUPPLYING COMPRESSED AIR TO A ROTATING PART OF A PRINTING PRESS

[75] Inventors: Manfred Herold, Kahl/Main; Herbert Rebel, Rodgau, both of Fed. Rep. of Germany

[73] Assignee: Man Roland Druckmaschinen AG, Fed. Rep. of Germany

[21] Appl. No.: 634,761

[22] Filed: Dec. 27, 1990

[30] Foreign Application Priority Data

Dec. 27, 1989 [DE] Fed. Rep. of Germany ....... 3943119

[51] Int. Cl.⁵ .............................................. F16L 39/04
[52] U.S. Cl. .................................... 285/131; 384/490; 285/136
[58] Field of Search ........................... 384/903, 490 X; 285/134, 135, 136, 131

[56] References Cited

U.S. PATENT DOCUMENTS

| | | | |
|---|---|---|---|
| 2,343,491 | 3/1944 | Bard et al. | 285/136 |
| 2,458,343 | 1/1949 | Carleton | 285/136 |
| 2,768,843 | 10/1956 | Zeilman | 285/136 |
| 3,829,103 | 8/1974 | Sussman | 285/136 |
| 3,833,278 | 9/1974 | Green | 384/490 |
| 4,577,892 | 3/1986 | Wrülich et al. | 285/136 |
| 4,928,997 | 5/1990 | Reisener et al. | 285/136 |
| 4,938,614 | 7/1990 | Imamura et al. | 384/903 |

FOREIGN PATENT DOCUMENTS 2570466 9/1984 France .
78150 5/1970 German Democratic Rep. .

Primary Examiner—Eric K. Nicholson
Attorney, Agent, or Firm—Leydig, Voit & Mayer

[57] ABSTRACT

A rotating union for supplying compressed air to the end of a journal of a rotating part of a printing press including a rotor disposed on the rotational axis of the journal and a tubular housing disposed in surrounding relation about the rotor. A plurality of ball bearings each having inner and outer bearing races are disposed between the rotor and tubular housing member for defining a plurality of axially spaced annular air chambers corresponding in number to the air supply lines connected to the tubular housing. Sealing discs are disposed adjacent an axial end of the bearings which in response to communication of pressurized air to the annular air chambers sealingly engage the axial ends of the inner and outer bearing races to effect sealing of the annular air chambers. In pressureless operation, the sealing discs are retained by sealing rings.

15 Claims, 3 Drawing Sheets

ROTATING UNION FOR SUPPLYING COMPRESSED AIR TO A ROTATING PART OF A PRINTING PRESS

FIELD OF THE INVENTION

The invention relates to a rotating union for supplying compressed air to a rotating part, and more particularly, to a union for supplying compressed air to the journal of a rotating part of a printing press.

BACKGROUND OF THE INVENTION

The use of compressed air in cylinders and rollers of printing presses is known, for example, from EP 0 298 238 A2 wherein the compressed air acts to provide force amplification by way of a pneumatic diaphragm cylinder on hydraulic work cylinders effective to clamp a printing plate on the form cylinder of a sheet fed gravure rotating press. The compressed air in the case is supplied by way of a rotating union axially of the cylinder journal.

Rotating unions for such purpose are known, as shown in catalogue 777D, 1977, "Rotating Unions" of the Deublin company. The rotating unions disclosed therein comprise a rotor which is in the form of a shaft and which is flange connected at one end, for example, to the end face of the journal of a rotating member so that its rotational axis coincides with the rotational axis of the rotating member. A tubular housing is mounted on the rotor shaft, and sealing members are so disposed between the rotor shaft and the inner bore of the tubular housing such that an annular chamber is formed for each air-conveying duct. The annular chambers can receive compressed air by way of connecting bores in the tubular housing and the compressed air thus introduced into the chambers can be conveyed onwards through bores in the rotor shaft and rotor into the rotating part. An arrangement described more particularly on page 34 of the aforesaid publication comprises a rotor shaft, tubular housing, two radially spaced-apart plain bearings and spring-biased O-rings.

The overall shapes that result from multiduct rotating unions, as well as elaborate sealing arrangements employed, are disadvantages of such rotating union systems. The use of plain bearings and O-rings for mounting and sealing is particularly disadvantageous since plain bearings require a definite fit and moments of friction arise between the tubular housing and the rotor even in the absence of transmission of compressed air. This is further disadvantageous in cases in which the compressed air is transmitted predominantly when the press is either stationary or running slowly.

OBJECTS AND SUMMARY OF THE INVENTION

It is an object of the invention to provide a rotating union for supplying compressed air to the rotating part of a printing press in which the moments of friction are minimized during operation in which compressed air is not being supplied to the union.

Another object is to provide a rotating union as characterized above which is adapted to supply pressurized air through a plurality of air ducts, but which is relatively simple in construction and design and which lends itself to economic manufacture and maintenance.

Other objects and advantages of the invention will become apparent upon reading the following detailed description and upon reference to the drawings, in which:

Figure 1:
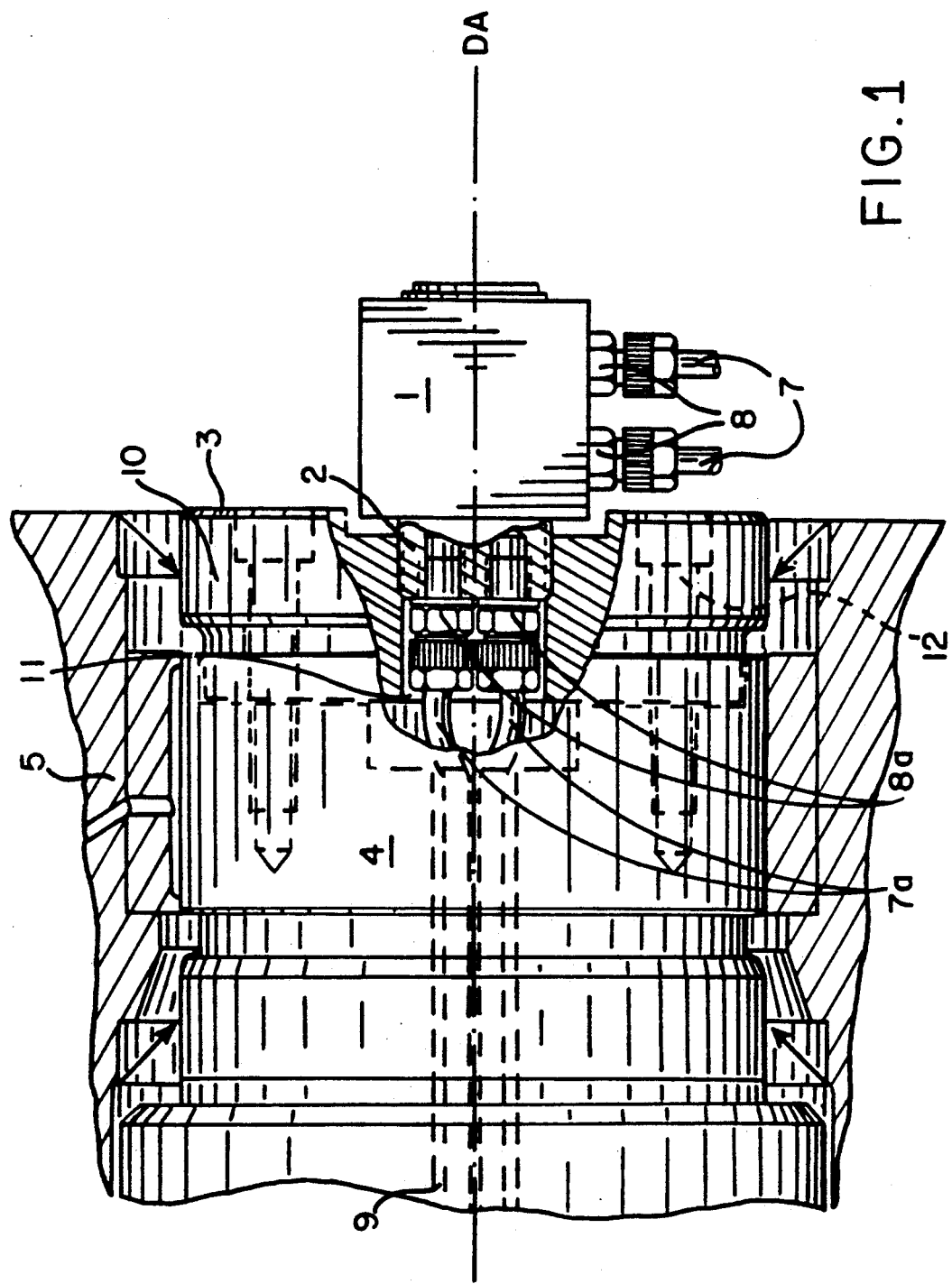
FIG. 1 is a fragmentary vertical section of a rotating union embodying the present invention disposed within the journal of the cylinder of a printing press.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DESCRIPTION OF THE PREFERRED EMBODIMENT

Figure 2:
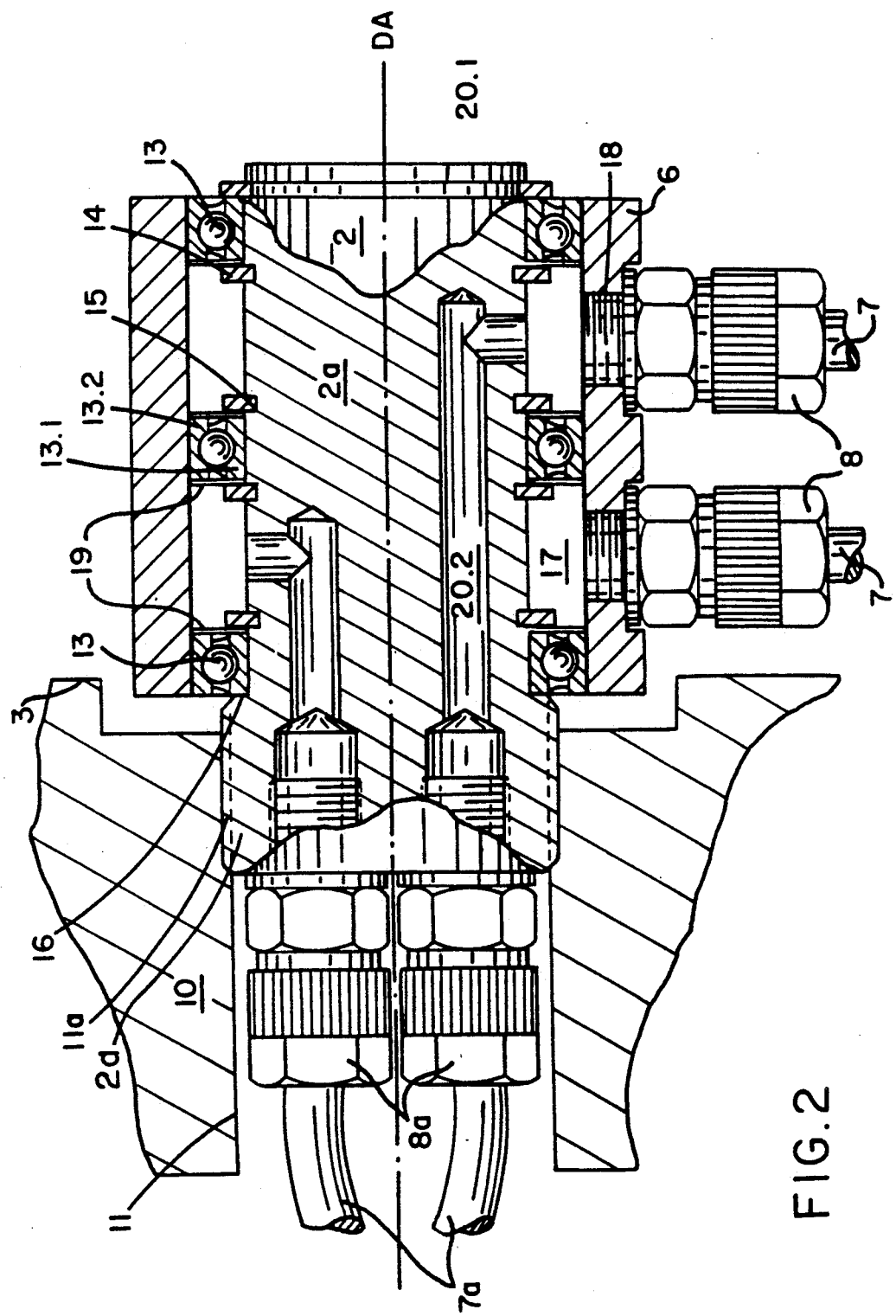
FIG. 2 is an enlarged fragmentary section of the rotating union shown in FIG. 1.

Referring now more particularly to FIGS. 1 and 2 of the drawings, there is shown an illustrative rotating union 1 embodying the present invention which is operable for supplying compressed air to the rotating part of a printing press, such as a printing press cylinder which has one or more pressurized air-operated means. The rotating union 1 is mounted in coaxial relation to a journal 4 of the printing press cylinder (not shown) which in turn is supported in a bearing 5 disposed in a frame wall of the press. The rotating union 1 includes a rotor 2 mounted for rotation with the journal 4 and a non-rotatable tubular housing 6 coaxially disposed in spaced relation about an end of the rotor 2 extending outwardly of the journal 4.

For supplying compressed air to the union 1, a plurality of air supply lines or conduits 9, in this case two in number, are secured to the housing 6 by means of screwed fasteners or fittings 8, as shown in FIG. 2. For mounting the rotor 2 of the union 1 to the journal 4, the journal 4 in this case has an end cap 10 which defines an end face 3 of the journal. The rotor 2 has a slightly enlarged end 2a that is screwed into threaded engagement with an internally threaded section 11a of an axial bore 11 of the end cap 10. The end cap 10 is secured to the journal 4 by screws 12.

For communicating pressurized air from the union 1 through the journal 4 and into the printing cylinder or other rotating part mounted thereon, a plurality of lines or conduits 7a, corresponding in number to the supply conduits 7, are mounted on the end 2a of the rotor 2 disposed within the union cap 10. Each of the lines 7a is secured to the end of the rotor by an appropriate threaded fastener or fitting 8a. The lines 7a extend through the bore 11 of the end cap 10. and through a concentric bore 9 within the journal 4 (FIG. 1).

In accordance with the invention, roller bearings each having inner and outer races are disposed between the tubular housing and rotor of the union for defining a plurality of annular air ducts or chambers therebetween corresponding in number to the air inlet lines, each bearing having an annular sealing disc, which in response to communication of pressurized air to the union is forced into sealing engagement with lateral ends of the inner and outer bearing races to effect appropriate sealing of the annular air chambers with the union. In the illustrated embodiment, three identical deep-groove ball bearings 13, each having inner and outer races 13.1 and 13.2, are disposed between the rotor 2 and the tubular housing 6 for defining a pair of annular air ducts or chambers 17, which each are in fluid communication with one of the inlet conduits 7a. For securing the inner races 13.1 in appropriate mounted position on the rotor 2, securing rings 14 are mounted adjacent axial ends of the inner race, as shown in FIG. 2, the securing rings each being disposed in a respective annular groove 15 in the rotor 2. The end 2a of the rotor in this case is of slightly increased diameter so as to form a shoulder 16 on which the inner race of the first bearing 13 bears. It can be seen, therefore, that the annular chambers 17 each are defined by the bearings 13 and the outside and inside surfaces of the rotor 2 and tubular housing 6. The supply lines 7 communicate with bores 18 in the tubular housing 6, which as indicated above, are secured therein by appropriate screwed fasteners or like fittings 8 whereby compressed air may be supplied to the chambers 17.

For ensuring that compressed air supplied to the each chamber 17 does not escape through the bearings 13, sealing discs 19 in this instance are disposed between the bearings 13 and the sealing rings 14, lying flatly against the axial or lateral end face of the inner bearing race 13.1 and outer race 13.2 of the respective bearing 13 such that when pressurized air is directed through the inlet conduit 7 into the chambers 17 the sealing rings are forcefully moved into sealing engagement with the end faces of the inner and outer bearing races. The sealing discs 19 may be in the form of hardened thin steel discs. Alternatively, the discs 19 may be made of plastic, such as polyoxymethylene (POM) known, for example, under the trade name of "Delrin." Such plastic discs have been found to be particularly satisfactory in effecting tight sealing engagement with the lateral ends of the inner and outer bearing races 13.1, 13.2 in response to pressurization of the chambers 17.

The thickness of the sealing discs 19 between the securing ring 14 and the inner race 13.1 can be such that the disc is clamped against the inner race and is adapted for sealing engagement against the outer race only upon pressurization of the chambers 17. The sealing rings 14 alternatively can be received in companion annular grooves in the housing 6 for retaining the axial position of the bearing and clamping the sealing disc in place, with the disc then being adapted for sealing engagement with the inner race of the bearing upon pressurization of the chamber 17. Preferably, the internal ball receiving rolling zones of the bearings 17 are closed sealingly and have a long-life grease packing. While the invention has been described in connection with deep-groove ball bearings, it will be appreciated that other kinds of rolling bearings also may be used. It is advantageous, however, to use deep-groove ball bearings since they are simple and rugged in construction and provide reliable axial guidance in support of the housing 6 on the rotor 2.

In order that compressed air introduced into the chambers 17 can be conveyed onward by way of the rotor 2 into the journal 4, the rotor 2 in this case is formed with radial bores 20.1 which each communicate with a respective axial bore 20.2. The radial bores each communicate with a respective one of the inlet conduit 7 and communicate pressurized air through its respective axial bore 20.2 and discharge line 7a. The axial bores 20.2 in this instance are of increased diameter in the connection zone of the fasteners 8a and have screw threadings which in cooperation with the fasteners 8a provide sealing tightness, as shown in FIG. 2.

Figure 3:
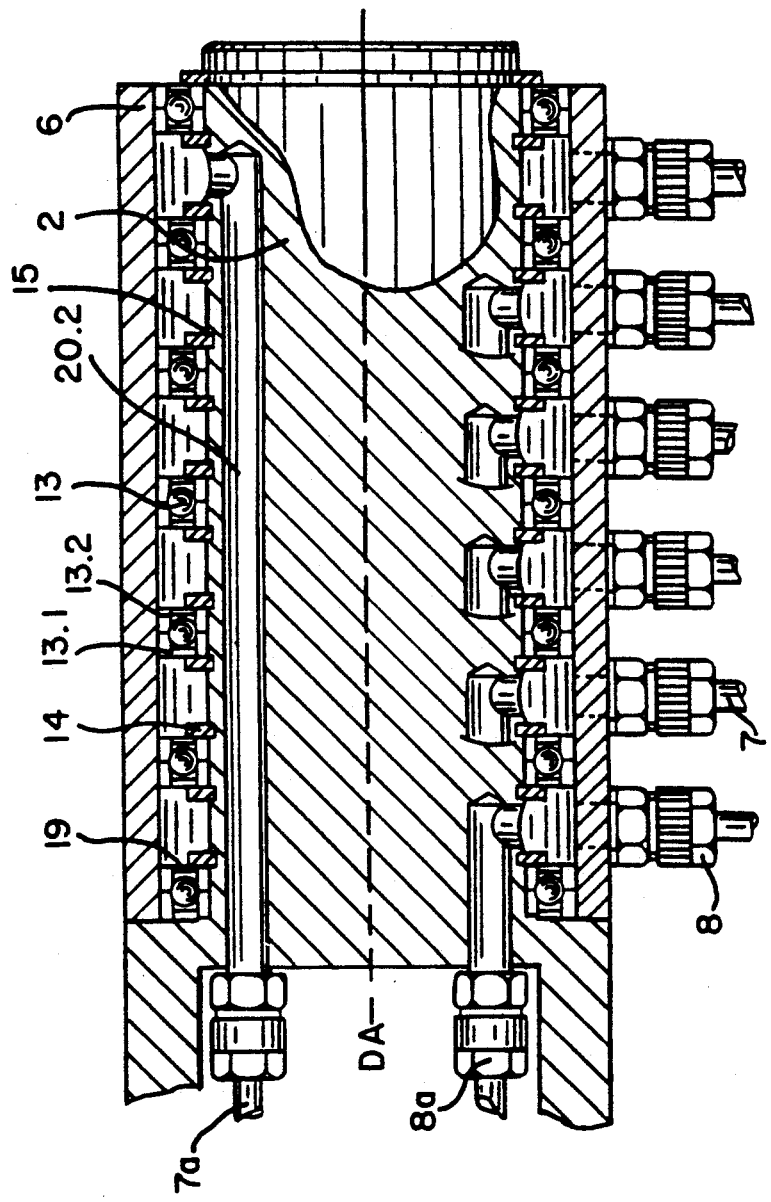
FIG. 3 is a fragmentary section of an alternative embodiment of a rotating union according to the present invention.
Figure 4:
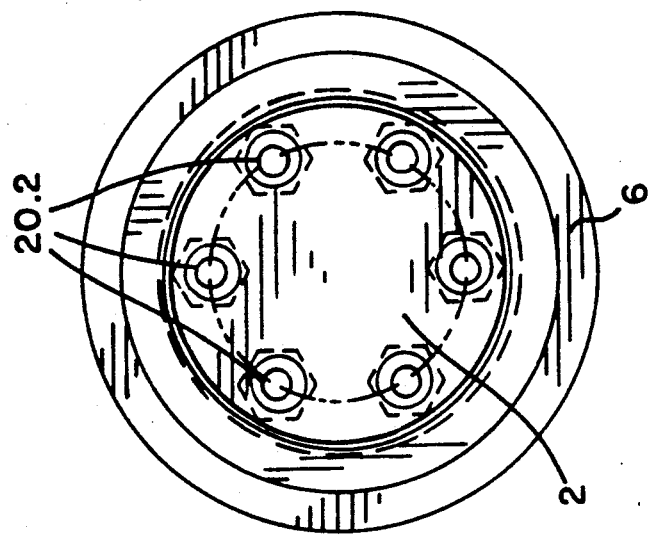
FIG. 4 is a left-hand end view, in partial section, of the rotating union shown in FIG. 3.

Referring now to FIGS. 3 and 4, there is shown an alternative embodiment of union according to the invention wherein the rotor 2 and tubular housing member 6 are of increased axial length and a greater number of deep groove ball bearings 13 are provided, each having respective securing rings 14 and sealing discs 19, for defining a greater number of air ducts or chambers. In this embodiment, the fasteners or fitting 8 are disposed in coplanar relationship along the length of the tubular housing member for facilitating easy connection of the supply lines 7 to the housing 6. The fasteners 8a at the end of the rotor 2 and the bores 22a are arranged symmetrically in the fashion of a hexagon, as viewed in FIG. 4. Consequently, the radial bores 21.1 extend outwardly in star fashion. It will be appreciated that the bores 20.1 and 20.2 may be ranged in different configurations.

The particular advantage of a rotating union for two or more compressed air ducts is not just the simple compact construction, comprising a rotor 2, tubular housing 6, deep groove ball bearings 13, securing rings 14 and sealing discs 19, but its production (e.g. bores 18, 20.1, 20.2) and, by virtue of its construction, it simplicity of assembly and dismantling. Since the discs 19 sealingly engage the ends of the bearing 13 only when compressed air is transmitted to the chamber 17, the moments of friction arising between the rotor 2 and housing 6 in operation without the transmission of compressed air is greatly minimized. It will be appreciated that the rotary union according to the invention not only is applicable for conveying compressed air, but also, for example, for conveying pressurized oil through a rotating member for lubrication or cooling.

We claim:

1. A rotating union for supplying compressed air to the end of a journal of a rotating part of a printing press comprising a rotor disposed on the rotational axis of the journal, a fixed tubular housing disposed in surrounding relation about the rotor, a plurality of roller bearings each having inner and outer bearing races disposed between said rotor and tubular housing member for defining a plurality of axially spaced annular air chambers, compressed air supply lines corresponding in number to said annular air chambers and being coupled to said tubular housing member each for communicating pressurized air to a respective one of said annular air chambers, compressed air discharge lines connected to said rotor and each communicating with a respective one of said annular air chambers, and sealing discs each being affixed adjacent an axial end of one of said races of each said bearing and which in response to communication of pressurized air to said annular air chambers sealingly engage the axial end of the other race of the respective bearing to effect sealing of the annular air chambers and which upon the interruption of communication of pressurized air to said air chambers permit relative movement of the disc without substantial frictional contact with the other race.

2. The rotary union of claim 1 including a securing ring affixed adjacent an axial end of each of said bearings for securing said bearings in axial position.

3. The rotary union of claim 2 in which said bearings are deep-groove ball bearings.

4. The rotary union of claim 2 in which said sealing discs each are secured between an axial end of said bearing and one of said securing rings.

5. The rotary union of claim 3 in which each said bearing has a ball-carrying rolling zone sealed with a lubricant.

6. The rotary union of claim 4 in which said sealing disc seals are hardened steel discs.

7. The rotary union of claim 4 in which said sealing disc seals are made of plastic.

8. The rotary union of claim 4 in which said bearings define two annular air chambers and at least one of said bearings has sealing discs disposed on opposite axial ends thereof.

9. The rotary union of claim 1 in which said rotor is formed with internal bores communicating between said annular air chambers and said discharge lines.

10. The rotary union of claim 1 in which said journal includes an end disc that defines an end face of the journal, and said end disc is formed with a bore within which said rotor is affixed.

11. A journal for rotatably supporting a part requiring compressed air from an outside source comprising a rotating union mounted on said journal and having a rotor disposed on a rotational axis of the journal, a fixed tubular housing disposed in surrounding relation about the rotor, a plurality of roller bearings each having inner and outer bearing races disposed between said rotor and tubular housing member for defining a plurality of axially spaced annular air chambers, a securing ring affixed adjacent an axial end of each of said bearings for securing said bearings in axial position, compressed air supply lines corresponding in number to said annular air chambers and being coupled to said tubular housing member each for communicating pressurized air to a respective one of said annular air chambers, compressed air discharge lines connected to said rotor and each communicating with a respective one of said annular air chambers, and sealing discs each being affixed adjacent an axial end of one of said races of each said bearing and which in response to communication of pressurized air to said annular air chambers sealingly engage the axial end of the other race of the respective bearing to effect sealing of the annular air chambers and which upon the interruption of communication of pressurized air to said air chambers permit relative movement of the disc without substantial frictional contact engagement with the other race.

12. The rotary union of claim 11 in which said bearings are deep-groove ball bearings.

13. The rotary union of claim 12 in which saiod sealing discs each are secured between an axial end of one of said bearing races and one of said securing rings.

14. The rotary union of claim 11 in which said rotor is formed with internal bores communicating between said annular air chambers and said discharge lines.

15. The rotary union of claim 14 in which said journal includes an end disc that defines an end face of the journal, and said end disc is formed with a bore within which said rotor is affixed.

* * * * *